(12) United States Patent
Bhatoolaul et al.

(10) Patent No.: US 6,788,940 B2
(45) Date of Patent: Sep. 7, 2004

(54) CELLULAR MOBILE TELEPHONE NETWORK AND METHOD OF OPERATING THE SAME

(75) Inventors: David Lahiri Bhatoolaul, Grange Park (GB); Qiang Cao, Swindon (GB); Patrick Georges Venceslas Charriere, Tetbury (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 554 days.

(21) Appl. No.: 09/805,094

(22) Filed: Mar. 13, 2001

(65) Prior Publication Data

US 2001/0046864 A1 Nov. 29, 2001

(30) Foreign Application Priority Data

Mar. 14, 2000 (EP) .......................................... 00302049

(51) Int. Cl.⁷ ................................................ H04Q 7/20
(52) U.S. Cl. ........................ 455/442; 455/436; 455/450; 370/331
(58) Field of Search ................................ 455/436, 442, 455/439, 440, 441, 450; 370/331, 332, 328, 310.2, 320

(56) References Cited

U.S. PATENT DOCUMENTS

| | | | | |
|---|---|---|---|---|
| 5,649,000 A | | 7/1997 | Lee et al. ................. 455/436 |
| 6,122,512 A | * | 9/2000 | Bodin ...................... 455/440 |
| 6,259,724 B1 | * | 7/2001 | Esmailzadeh ............... 375/143 |
| 6,490,455 B1 | * | 12/2002 | Park et al. ............... 455/456.4 |
| 6,539,236 B2 | * | 3/2003 | Hakkinen et al. .......... 455/525 |
| 6,614,779 B1 | * | 9/2003 | Gutierrez et al. .......... 370/350 |
| 6,631,121 B1 | * | 10/2003 | Yoon ........................ 370/329 |
| 6,643,275 B1 | * | 11/2003 | Gustafsson et al. ........ 370/328 |

FOREIGN PATENT DOCUMENTS

GB  2 308 042 A  11/1997  ............ H04Q/7/36

OTHER PUBLICATIONS

XP 002120339—Tero Ojanpera et al. "Wideband CDMA for Third Generation Mobile Communications", Wideband CDMA for Third Generation Mobile Communications, XX,XX, 1998 pp. 144–145.

European Search Report dated Nov. 8, 2000.

* cited by examiner

Primary Examiner—Marsha D. Banks-Harold
Assistant Examiner—Nghi H. Ly

(57) ABSTRACT

A cellular mobile telephone network is disclosed in which a mobile station requests service in data modulated on a common random access channel (RACH) in a format associated with first a cell in which the mobile station is located. Base stations in cells neighbouring the first cell, are configured to demodulate the RACH message burst having the format associated with the first cell, and to pass the demodulated data to a radio network controller (RNC). This enables the average power required for a successful RACH transmission to be reduced.

10 Claims, 2 Drawing Sheets

CELLULAR MOBILE TELEPHONE NETWORK AND METHOD OF OPERATING THE SAME

CROSS-REFERENCE TO RELATED APPLICATION

This application claims priority of European Patent Application No. 00302049.2, which was filed on Mar. 14, 2000.

FIELD OF THE INVENTION

This invention relates to cellular telephone networks and to a method of operating the same.

BACKGROUND OF THE RELATED ART

The background to the related art will be described with reference to a particular application. The reader will readily comprehend that the invention can be applied more generally. When a mobile is switched on in a cellular system, it first searches for the best cell that it can connect to and then attempts to send a message to the best cell found. The contents of this message provide the network with a unique identifier for the mobile, an indication of the quality of the down link (DL) channel and the type (idle/connected) of connection desired, for example. The transmission of the mobile's initial request for network connection messages is uncoordinated and as a result requires complex procedures, commonly referred to as Random Access CHannel (RACH) procedures, to reduce the probability of interference and collisions between neighbouring mobiles simultaneously attempting to access the network via same cell.

In CDMA cellular systems, the likelihood of a mobile's RACH message being successfully received by a cell is largely dependent on its transmit power. Unfortunately having all mobiles transmit at the maximum power possible is in many circumstances not only unnecessary but also unacceptable due to the resultant intra-cell interference generated. Several methods of reducing the RACH message transmit have been proposed based on gently ramping up the mobile transmit power of the RACH message.

Methods that reduce the average transmit power of the RACH can be applied to optimise different aspects of a CDMA cellular system. Aspects that can be improved, include uplink cellular capacity and/or cell coverage.

SUMMARY OF THE INVENTION

Against this background, there is provided a cellular mobile telephone network, wherein a mobile station requests service in data modulated on a common random access channel (RACH) in a format associated with first a cell in which the mobile station is located, and wherein base stations in cells neighbouring the first cell, are configured to demodulate the RACH message burst having the format associated with the first cell, and to pass the demodulated data to a radio network controller (RNC). As will be explained, this enables the average power required for a successful RACH transmission to be reduced.

In a preferred form, said data is sent in separate preamble and message bursts; and a radio network controller (RNC) is responsive to receipt of the preamble burst, to instruct base stations in the neighbouring cells to demodulate the RACH message burst having the format associated with the first cell, and to pass the demodulated data to a radio network controller (RNC).

In this case, the RNC may be operative to determine from the propagation delay of a data burst from a mobile station located in the first cell, whether the mobile station is in a handover region and, if it is in a handover region, to instruct base stations in neighbouring cells to which the mobile station may move from the handover region, to demodulate the RACH message burst having the format associated with the first cell, and to pass the demodulated data to a radio network controller (RNC) as said.

The mobile station may be operative to compare the signal strengths of transmissions received from different base stations to determine whether or not it is in a handover region, and to send RACH data with one of a reserved set of physical channel attributes if the base station is in the handover region.

In this case the RNC is preferably operative to instruct a base station in the first cell to assign first hardware to search for RACH data having the physical channel attributes belonging to mobile stations located in a handover region, and to assign second hardware to search for RACH data having the physical channel attributes belonging to mobile stations located in a non-handover region.

In that arrangement, the RNC is preferably operative to instruct a base station in a neighbouring cell to assign hardware to search for RACH data having a format associated with the first cell and physical channel attributes belonging to mobile stations located in a handover region.

The invention also extends to a method of operating a cellular mobile telephone network, comprising sending a request for service from a mobile station by means of data modulated on a common random access channel (RACH) in a format associated with first a cell in which the mobile station is located, and at base stations in cells neighbouring the first cell, demodulating the RACH message burst having the format associated with the first cell, and passing the demodulated data to a radio network controller (RNC).

The invention further extends to computer program for carrying out the method.

BRIEF DESCRIPTION OF THE DRAWINGS

Embodiments of the invention will now be described with reference to the accompanying drawings, in which.

DETAILED DESCRIPTION

Cell coverage of the RACH channel has been recently identified as a key problem by the 3GPP standard. The problem arises from the fact that the maximum cell coverage of the original basic RACH message is significantly less than the maximum cell coverage of some of the major connected mode services, such as AMR voice, require a much lower minimum signal-to-interference level compared to the RACH.

The invention described herein enables a reduction in the average power required for a successful RACH transmission in a CDMA cellular system, thereby improving either the potential RACH coverage range or UL capacity.

In existing proposals, the UL RACH access burst in any cellular system has to perform two key functions. Firstly it has to notify (similar in concept to a beacon) the BTS of the presence of a mobile wishing gain access to the network. Secondly it must convey sufficient information to the network, so that the network can identify the mobile requesting access, the service mode that the mobile wishes to enter and potentially also the quality of the DL channel.

The physical format of the UL RACH access bursts in CDMA systems generally fall in one of two categories depending on whether these two key functions of the access burst are split between two (or more) physically separate bursts or combined to form a single burst.

Figure 1:
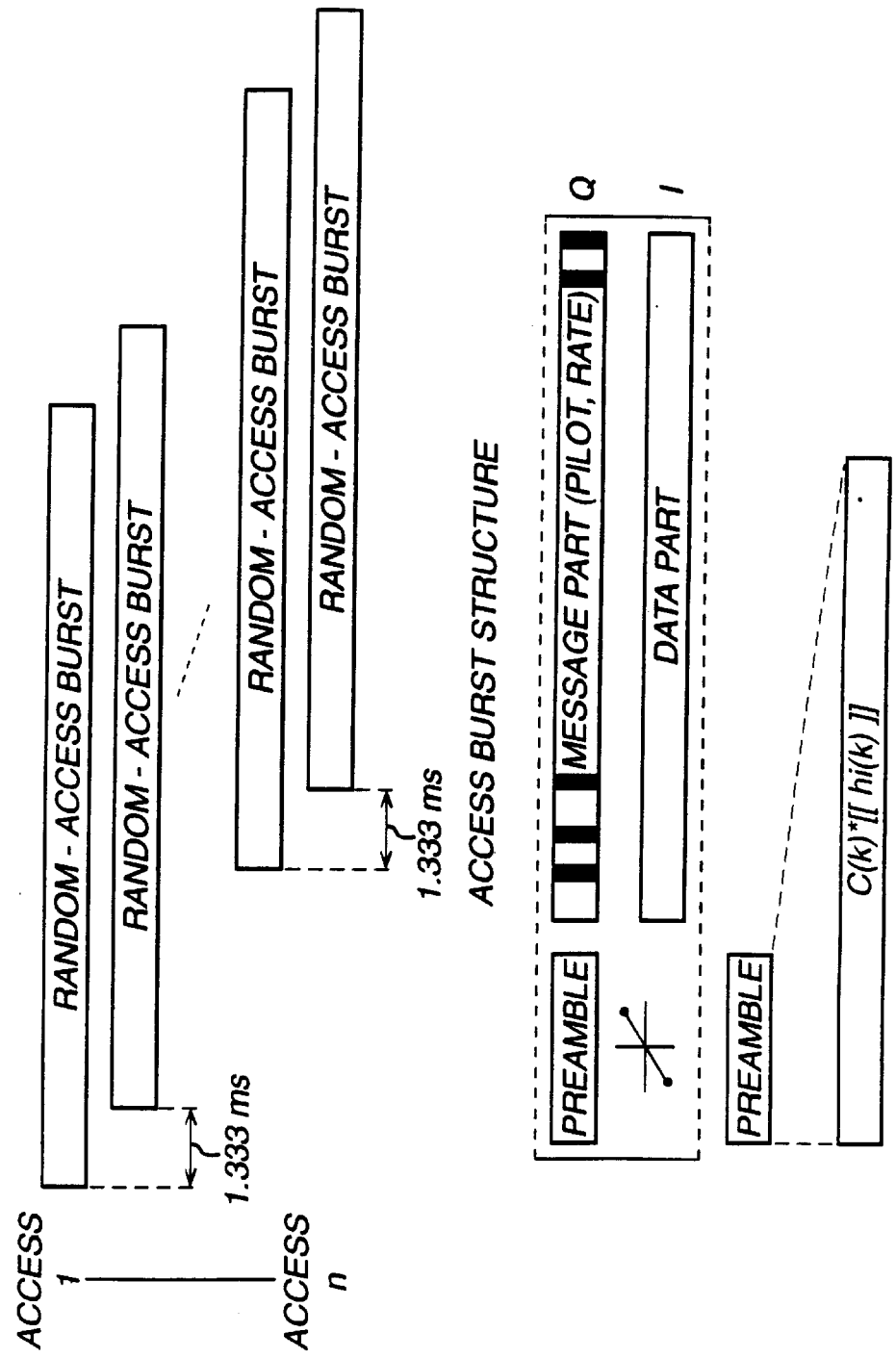
FIG. 1 illustrates a preamble based RACH access burst.

Referring to FIG. 1, IS-95 is an example of a CDMA cellular system that employs a single combined physical burst structure, known as the RACH access probe, for its RACH channel. To minimise the interference power added to the UL by this form of RACH, the mobile initially transmits this burst at a power based on an estimate of channel path-loss obtained by the measuring the downlink power of common channels (such as the pilot channel). If the burst is successfully detected and demodulated, the IS-95 BTS will immediately inform the mobile on the DL so that it ceases further RACH access attempts. If the mobile's initial RACH burst is not acknowledged within a period of 1.333 ms, the mobile assumes it's previous RACH burst was unsuccessful and transmits the same RACH message burst but at a slightly higher power. Reasons why a RACH burst may not be successfully detected and acknowledged include collision, insufficient power to overcome channel fading, or simply insufficient processing resources at the BTS. Using this so-called power ramping procedure the interference power added to the UL by this form of RACH can be minimised.

Referring again to FIG. 1, recent CDMA cellular systems such as 3GPP split the mobile Random Access Burst into two independent parts that are separated in time. The first part, sometimes referred to as a preamble, acts like a beacon to attract the attention of the BTS, whereas the second part, or 'message' part, contains all the relevant information required to set-up a network connection. The main features of this preamble section include:

1) It has a short length and formatting which make detection far simpler;

2) A large number of possible physical format and transmission timing permutations reduces the probability of collision;

3) The procedure for defining its transmit power, is based on repeated transmissions but at higher and higher powers.

4) Gaps in time that exists between the preamble being successfully detected, acknowledged and the corresponding RACH message part being transmitted.

Each preamble is a signature pattern of 16 bits replicated 256 times and modulated by a spreading code. The mobile only transmits the message part once detection of its preamble (or probe) part has been acknowledged by the BTS on the DL. By directly linking the transmit power of the RACH message part to the power at which the successful preamble was transmitted, the interference power added to the UL by the RACH can minimised to a limited degree.

For currently proposed CDMA cellular systems, the physical format of the RACH burst (regardless of its structure) is unique to an individual cell. A particular BTS is only configured to detect, demodulate and respond its own format of RACH bursts.

Some embodiments of the invention to be described assume the application of a preamble based RACH access burst, e.g. that applied by 3GPP. FIG. 1 shows the basic physical format of the mobile RACH message for 3GPP. It consists of a short preamble followed by a separate message part. The physical attributes of the burst, such as the time at which it is sent, the spreading and/or channelisation code used can be randomly selected from a known set so as to reduce the probability of collision between two or more mobiles. The mobile uses the preamble part as a beacon to the BTS informing it of the mobile's desire to transmit a RACH message. The mobile repeatedly sends the BTS a preamble at pre-defined intervals but with ever-increasing power (up to a fixed maximum), until the BTS successfully detects the preamble. When the mobile determines that the BTS has successfully detected its preamble, it stops transmitting its preamble, waits a predefined period and transmits its corresponding message part at a power directly related to the transmit power of the successfully detected preamble.

A key feature of current CDMA cellular systems is their ability, referred to as soft handover or handoff, to use 2 or more BTSs to support dedicated DL and UL traffic to and from a particular mobile. The BTS controller, or RNC in 3GPP terms, is able to use the different versions of a mobile's UL traffic data received from the 'active set' of BTSs serving a particular mobile to improve the overall quality the data traffic passed further up the network. The methods (such as soft-combining and frame selection) that the RNC can apply to improve the UL data traffic it processes are understood by those skilled in the art.

In embodiments of the invention, the BTS of CDMA cellular system can be configured to detect, demodulate and respond to the RACH bursts of not only their cell, as in the prior art, but also neighbouring cells. In this scenario the average RACH burst transmit power in the region of overlap between cells, can be significantly reduced without loss of performance. The process effectively applies the principles of soft handover, well developed for dedicated uplink channels, to the common RACH channel.

Several different techniques of exploiting the ability of neighbouring BTSs to process each other's RACH bursts will now be described. These are differentiated by the added complexity (or intelligence) required by the network and/or mobile.

In a basic embodiment, BTSs have the potential ability to process their neighbouring cells RACH burst. BTSs process neighbouring cells RACH bursts in an uncoordinated manner as and when processing resources are free. BTSs pass up to the RNC all processed RACH bursts (their own as well as neighbouring) automatically.

The main advantages of this embodiment of the invention are the minimal changes required to standards to permit this enhanced functionality and its possible application to both the single-stage RACH burst and the preamble based multi-stage RACH burst.

The disadvantages of this embodiment of the invention are the extra traffic generated across the RNC-BTS interfaces and the inefficient use of processing resources at the BTSs.

In a more sophisticated embodiment, BTSs are configured to be able to process fully (detect and demodulate) the 2-stage RACH bursts of their own cell and process partially (demodulate only) the corresponding RACH bursts of neighbouring cells. BTSs process neighbouring cells RACH bursts in a co-ordinated manner directed by the RNC.

Once a BTS detects the presence of a preamble it acknowledges the mobile as before, but also sends a message to the RNC, identifying itself and the presence of a potential RACH access burst at a particular point in time. The RNC can use this information to simply trigger all neighbouring cells to configure any spare $2^{nd}$ stage RACH processing resources to expect a RACH message for that particular neighbouring cell. Alternatively the RNC can use the point in time (also known as the propagation delay) of the first preamble stage of the RACH to determine if the RACH burst arrived from mobile in a possible soft handover zone. If the RNC decides this is the case it can inform the appropriate neighbouring cells to prepare for receiving the corresponding message part.

The main advantages of this embodiment are the more efficient use of available RACH processing resources at a BTS and the reduced BTS-RNC traffic compared to the simplest implementation described above.

The disadvantages of this embodiment are that it requires the secondary neighbouring BTSs to perform channel estimation without channel and timing knowledge obtained from the first part of the RACH burst detection phase. This method also requires fast inter BTS-RNC-BTS communications. In addition there will be many occasions when the extra processing capability offered by the neighbouring BTS will be wasted due to the mobile not being in a soft hand-over region unless information regarding the propagation delay is exploited by the RNC.

In another, even more sophisticated embodiment, BTSs are configured to be able to process fully (detect and demodulate) the 2-stage RACH bursts of their own cell and process partially (demodulate only) the corresponding RACH bursts of neighbouring cells. The BTSs process neighbouring cells RACH bursts in a coordinated manner directed by the RNC. Mobiles are able to recognise that they are in a potential soft-handover region and accordingly select a sub-set of RACH physical channel attributes reserved for mobiles in that particular geographical region.

In this embodiment, certain RACH physical channel attributes, such as the preamble signature or channelisation code, are reserved for use by mobiles that detect they are in a soft handover region. A mobile autonomously determines whether or not it is in a soft-handover region by measuring the relative received power levels of the pilot and/or common control channels broadcast by cells. Having determined that the mobile is in this special "handover" region it selects the physical attributes of the RACH channel for the strongest cell, "cell A", that have been broadcast by the cell as being reserved for mobiles in a possible soft-handover zone.

At the "cell A" BTS, the RACH detection hardware is partitioned intelligently to search for RACH bursts with particular physical attributes over geographical areas which are categorised as covering the soft-handover zone or not. Note that the Network could dynamically vary this partitioning to provide more or less RACH processing capability in one of zones depending on the intensity of RACH traffic in that area.

Figure 2:
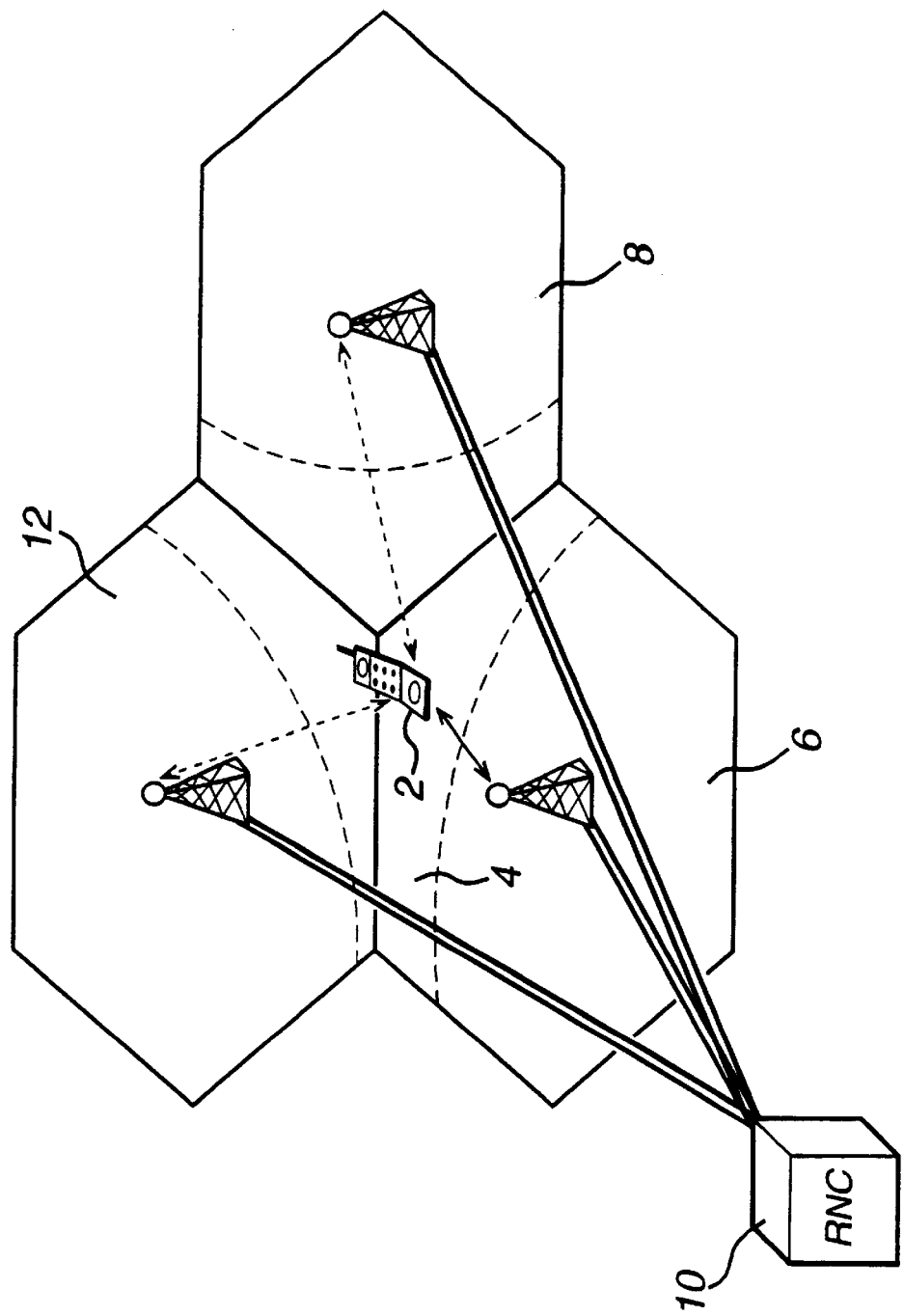
FIG. 2 illustrates soft handover.

Referring to FIG. 2, a mobile station 2 is located in a soft handover zone 4 of a cell 6.

Cell 8, a neighbouring cell to cell 6, has hardware resources reserved to scan/search for RACH bursts aimed at cell 6 from mobiles in the soft-handover region 4. These resources are used to constantly search for RACH bursts (single or multi-stage bursts). When a RACH burst is successfully detected by the cell 6 it can report blindly to the RNC 10 the results (as suggested by the first embodiment) in an uncoordinated fashion. Alternatively if the 2 stage preamble based RACH burst is used, Cell 8 can be commanded by the RNC to process the neighbouring cell's RACH once the primary cell 6 has acknowledged the preamble of the mobile. This of course requires fast inter-BTS communications via the RNC.

In principle reserving sub-sets of RACH bursts with unique physical attributes for each possible 'best' neighbouring cell could be applied to extend this concept. For example:

RACH burst preambles signatures (or access slots) 1–4 could be reserved for mobiles that have determined they are not in a handover region;

RACH burst preambles signatures (or access slots) 5–6 could be reserved for mobiles that have determined they are in a strong handover region, where cell 6 is the strongest and cell 8 is the second strongest;

RACH burst preambles signatures (or access slots) 7–8 could be reserved for mobiles that have determined they are in a strong handover region, where cell 6 is the strongest and a cell 12 is the second strongest.

The main advantage of this embodiment is that it makes more efficient use of available RACH processing resources at a BTS by narrowing down the range of RACHs physical formats that a neighbouring BTS needs to search to provide RACH soft-handover capability. Another advantage of this concept is that it immediately makes clear to the network by appropriate messaging from the BTS to the RNC, that the mobile could enter steady state handover mode at any instant. This should reduce the time it takes the mobile to enter the soft-handover state.

A disadvantage of this embodiment is that requires extra information to be broadcast on the downlink, to define: what RACH physical attributes are reserved for a particular soft-handover region; and what criteria/thresholds the mobile should use to determine if it is in the handover zone;

What is claimed is:

1. A cellular mobile telephone network, wherein a mobile station requests service in data modulated on a common random access channel (RACH) in a format associated with first a cell in which the mobile station is located, and wherein base stations in cells neighbouring the first cell, are configured to demodulate the RACH message burst having the format associated with the first cell, and to pass the demodulated data to a radio network controller (RNC); and wherein the RNC is operative to instruct a base station in the first cell to assign first hardware to search for RACH data having physical channel attributes belonging to mobile stations located in a handover region, and to assign second hardware to search for RACH data having the physical channel attributes belonging to mobile stations located in a non-handover region.

2. A cellular mobile telephone network as claimed in claim 1, wherein said data is sent in separate preamble and message bursts; and wherein a radio network controller (RNC) is responsive to receipt of the preamble burst, to instruct base stations in the neighbouring cells to demodulate the RACH message burst having the format associated with the first cell, and to pass the demodulated data to a radio network controller (RNC).

3. A network as claimed in claim 2, in which the RNC is operative to determine from the propagation delay of a data burst from a mobile station located in the first cell, whether the mobile station is in a handover region and, if it is in a handover region, to instruct base stations in neighbouring cells to which the mobile station may move from the handover region, to demodulate the RACH message burst having the format associated with the first cell, and to pass the demodulated data to a radio network controller (RNC) as said.

4. A network as claimed in claim 1 or 2, wherein the mobile station is operative to compare the signal strengths of transmissions received from different base stations to determine whether or not it is in a handover region, and to send RACH data with one of a reserved set of physical channel attributes if the base station is in the handover region.

5. A network as claimed in claim 1, wherein the RNC is operative to instruct a base station in a neighbouring cell to assign hardware to search for RACH data having a format associated with the first cell and physical channel attributes belonging to mobile stations located in a handover region.

6. A method of operating a cellular mobile telephone network, comprising; sending a request for service from a mobile station by means of data modulated on a common random access channel (RACH) in a format associated with first a cell in which the mobile station is located, and at base stations in cells neighbouring the first cell, demodulating the RACH message burst having the format associated with the first cell, and passing the demodulated data to a radio network controller (RNC); and including instructing a base station in the first cell to assign first hardware to search for RACH data having physical channel attributes belonging to mobile stations located in a handover region, and to assign second hardware to search for RACH data having the physical channel attributes belonging to mobile stations located in a non-handover region.

7. A method as claimed in claim 6, wherein said data is sent in separate preamble and message bursts; and including responding to receipt by the RNC of the preamble burst, to instruct base stations in the neighbouring cells to demodulate the RACH message burst having the format associated with the first cell, and to pass the demodulated data to a radio network controller (RNC).

8. A method as claimed in claim 7, including determining from the propagation delay of a data burst from a mobile station located in the first cell, whether the mobile station is in a handover region and, if it is in a handover region, instructing base stations in neighbouring cells to which the mobile station may move from the handover region, to demodulate the RACH message burst having the format associated with the first cell, and to pass the demodulated data to a radio network controller (RNC) as said.

9. A method as claimed in claim 7 or 8, including comparing the signal strengths of transmissions received from different base stations to determine whether or not it is in a handover region, and to sending RACH data with one of a reserved set of physical channel attributes if the base station is in the handover region.

10. A network as claimed in claim 6, including instructing a base station in a neighbouring cell to assign hardware to search for RACH data having a format associated with the first cell and physical channel attributes belonging to mobile stations located in a handover region.

\* \* \* \* \*